United States Patent
Wang et al.

(10) Patent No.: US 10,360,494 B2
(45) Date of Patent: Jul. 23, 2019

(54) CONVOLUTIONAL NEURAL NETWORK (CNN) SYSTEM BASED ON RESOLUTION-LIMITED SMALL-SCALE CNN MODULES

(71) Applicant: AltumView Systems Inc., Burnaby (CA)

(72) Inventors: Xing Wang, Port Coquitlam (CA); Him Wai Ng, Burnaby (CA); Jie Liang, Coquitlam (CA)

(73) Assignee: AltumView Systems Inc., Port Moody, BC (CA)

( * ) Notice: Subject to any disclaimer, the term of this patent is extended or adjusted under 35 U.S.C. 154(b) by 131 days.

(21) Appl. No.: 15/441,194

(22) Filed: Feb. 23, 2017

(65) Prior Publication Data

US 2018/0150740 A1    May 31, 2018

Related U.S. Application Data

(60) Provisional application No. 62/428,497, filed on Nov. 30, 2016.

(51) Int. Cl.
*G06K 9/00* (2006.01)
*G06K 9/20* (2006.01)
(Continued)

(52) U.S. Cl.
CPC .......... *G06N 3/04* (2013.01); *G06K 9/00228* (2013.01); *G06K 9/00268* (2013.01);
(Continued)

(58) Field of Classification Search
CPC ... G06T 7/11; G06T 5/50; G06T 7/248; G06T 2207/20021; G06N 3/045; G06N 3/04;
(Continued)

(56) References Cited

U.S. PATENT DOCUMENTS 9,953,679 B1 *   4/2018   Tse ..................... G11B 27/031
10,185,891 B1 *  1/2019   Martin ................ G06K 9/6218
(Continued)

OTHER PUBLICATIONS

Egmont-Petersen et al. "Image Processing with Neural Networks—a Review" Pattern Recognition 35 (2002) pp. 2279-2301.*
(Continued)

*Primary Examiner* — Mia M Thomas

(57) ABSTRACT

Embodiments of a convolutional neural network (CNN) system based on using resolution-limited small-scale CNN modules are disclosed. In some embodiments, a CNN system includes: a receiving module for receiving an input image of a first image size, the receiving module can be used to partition the input image into a set of subimages of a second image size; a first processing stage that includes a first hardware CNN module configured with a maximum input image size, the first hardware CNN module is configured to sequentially receive the set of subimages and sequentially process the received subimages to generate a set of outputs; a merging module for merging the sets of outputs into a set of merged feature maps; and a second processing stage for receiving the set of feature maps and processing the set of feature maps to generate an output including at least one prediction on the input image.

24 Claims, 7 Drawing Sheets

(51) Int. Cl.
  *G06K 9/46* (2006.01)
  *G06K 9/62* (2006.01)
  *G06N 3/04* (2006.01)
  *G06N 3/06* (2006.01)
  *G06N 3/08* (2006.01)
  *G06T 5/50* (2006.01)
  *G06T 7/11* (2017.01)
  *G06T 7/246* (2017.01)

(52) U.S. Cl.
  CPC ..... *G06K 9/00275* (2013.01); *G06K 9/00288* (2013.01); *G06K 9/2054* (2013.01); *G06K 9/4628* (2013.01); *G06K 9/6232* (2013.01); *G06K 9/6256* (2013.01); *G06K 9/6274* (2013.01); *G06N 3/0454* (2013.01); *G06N 3/06* (2013.01); *G06N 3/08* (2013.01); *G06T 5/50* (2013.01); *G06T 7/11* (2017.01); *G06T 7/248* (2017.01); *G06K 9/00402* (2013.01); *G06K 9/6289* (2013.01); *G06K 2009/00322* (2013.01); *G06K 2209/15* (2013.01); *G06T 2200/28* (2013.01); *G06T 2207/20021* (2013.01); *G06T 2207/20084* (2013.01); *G06T 2207/20221* (2013.01); *G06T 2207/20224* (2013.01); *G06T 2207/30201* (2013.01); *G06T 2210/12* (2013.01)

(58) Field of Classification Search
  CPC .......... G06N 3/08; G06N 3/06; G06K 9/2054; G06K 9/00268; G06K 9/00228; G06K 9/6256; G06K 9/00275; G06K 9/00288; G06K 9/6232
  See application file for complete search history.

(56) References Cited

U.S. PATENT DOCUMENTS

| | | | | |
|---|---|---|---|---|
| 10,185,895 | B1* | 1/2019 | Tse | G06T 5/20 |
| 10,198,689 | B2* | 2/2019 | Cao | G06K 9/4671 |
| 10,204,299 | B2* | 2/2019 | Chandraker | G06N 3/04 |
| 10,223,610 | B1* | 3/2019 | Akselrod-Ballin | G06K 9/6218 |
| 10,255,547 | B2* | 4/2019 | Woolley, Jr. | G06N 3/0454 |
| 2003/0002731 | A1* | 1/2003 | Wersing | G06K 9/4628 382/161 |
| 2005/0047647 | A1* | 3/2005 | Rutishauser | G06K 9/3233 382/159 |
| 2005/0125369 | A1* | 6/2005 | Buck | G06N 3/08 706/12 |
| 2005/0185835 | A1* | 8/2005 | Matsugu | G06K 9/4619 382/159 |
| 2006/0204053 | A1* | 9/2006 | Mori | G06K 9/00 382/118 |
| 2007/0047802 | A1* | 3/2007 | Puri | G06K 9/4628 382/157 |
| 2007/0244842 | A1* | 10/2007 | Ishii | G06K 9/4628 706/18 |
| 2008/0292194 | A1* | 11/2008 | Schmidt | G06T 7/0012 382/217 |
| 2009/0297007 | A1* | 12/2009 | Cosatto | G06K 9/00147 382/131 |
| 2010/0183217 | A1* | 7/2010 | Seung | G06K 9/342 382/156 |
| 2012/0301009 | A1* | 11/2012 | Dabic | G07D 3/14 382/136 |
| 2015/0278642 | A1* | 10/2015 | Chertok | G06N 3/02 382/156 |
| 2015/0379676 | A1* | 12/2015 | Girado | G06T 1/20 345/501 |
| 2016/0358321 | A1* | 12/2016 | Xu | G06T 7/0002 |
| 2017/0032222 | A1* | 2/2017 | Sharma | G06K 9/6256 |
| 2017/0060254 | A1* | 3/2017 | Molchanov | G06F 3/011 |
| 2017/0147905 | A1* | 5/2017 | Huang | G06K 9/6232 |
| 2017/0200078 | A1* | 7/2017 | Bichler | G06N 3/049 |
| 2017/0270387 | A1* | 9/2017 | Kulkarni | G06K 9/6218 |
| 2017/0300785 | A1* | 10/2017 | Merhav | G06K 9/6257 |
| 2017/0344876 | A1* | 11/2017 | Brothers | G06F 17/153 |
| 2018/0032801 | A1* | 2/2018 | Gur | G06K 9/00362 |
| 2018/0150740 | A1* | 5/2018 | Wang | G06T 7/11 |
| 2019/0026538 | A1* | 1/2019 | Wang | G06K 9/00261 |
| 2019/0043205 | A1* | 2/2019 | Wang | G06T 7/248 |
| 2019/0065817 | A1* | 2/2019 | Mesmakhosroshahi | G06K 9/0014 |
| 2019/0066326 | A1* | 2/2019 | Tran | G06T 7/73 |
| 2019/0073353 | A1* | 3/2019 | Yu | G10L 21/055 |
| 2019/0079533 | A1* | 3/2019 | Zhu | G05D 1/0253 |
| 2019/0079534 | A1* | 3/2019 | Zhu | G05D 1/0253 |

OTHER PUBLICATIONS

Krizhevsky et al. "ImageNet Classification with Deep Convolutional Neural Networks" Magazine Communications of the ACM vol. 60, Issue 6, Jun. 2017 (pp. 84-90).*

* cited by examiner

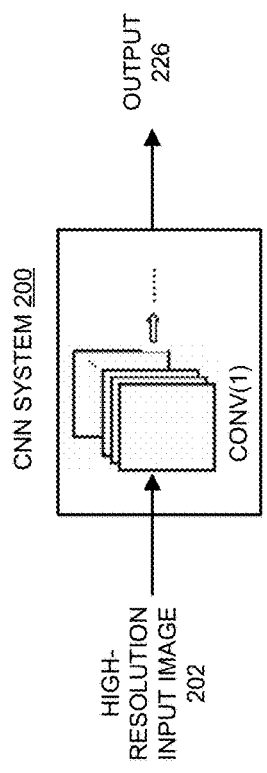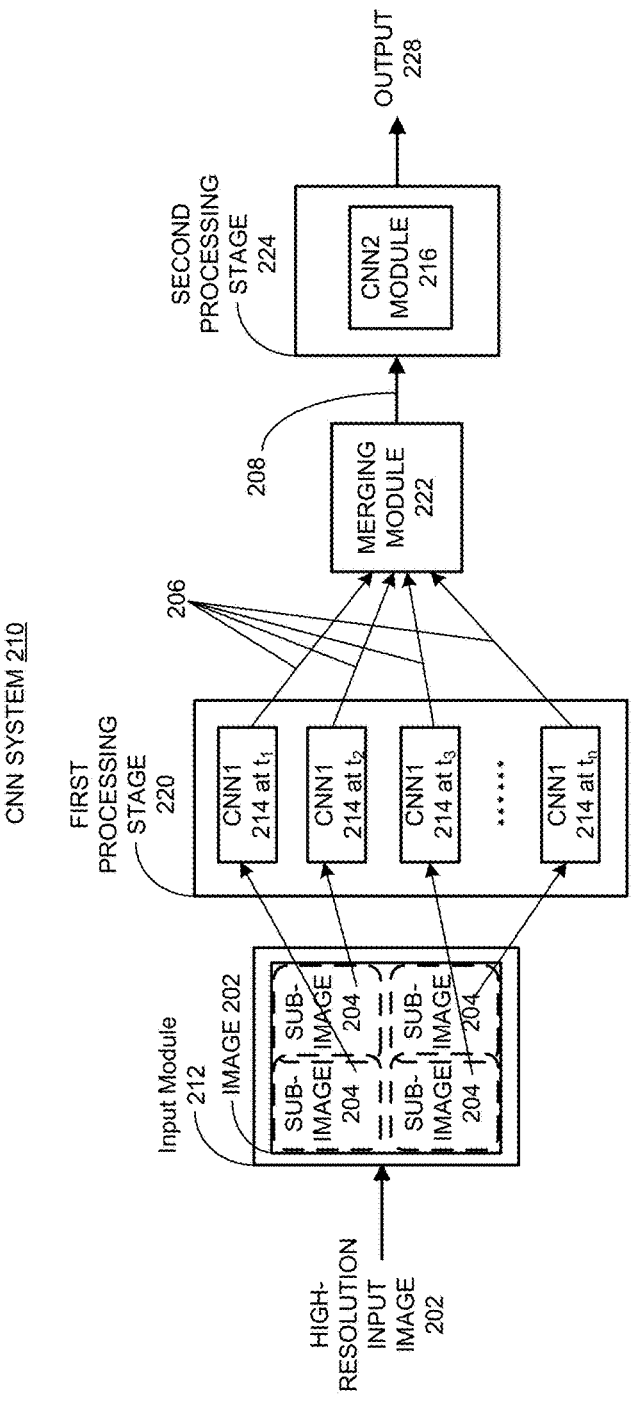

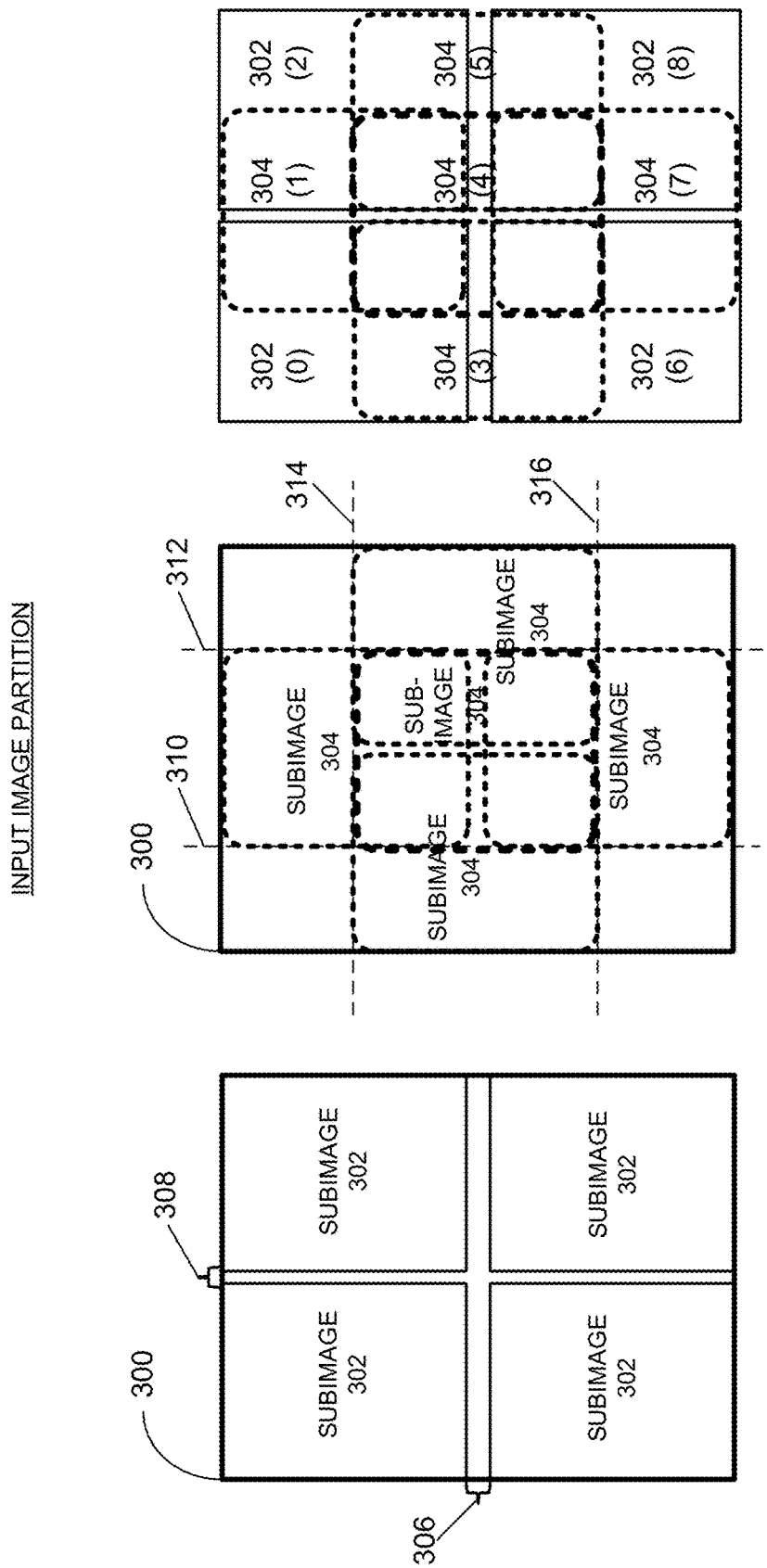

CONVOLUTIONAL NEURAL NETWORK (CNN) SYSTEM BASED ON RESOLUTION-LIMITED SMALL-SCALE CNN MODULES

PRIORITY CLAIM AND RELATED PATENT APPLICATIONS

This patent document claims benefit of priority under 35 U.S.C. 119(e) to U.S. Provisional Patent Application No. 62/428,497 entitled "CONVOLUTIONAL NEURAL NETWORKS (CNN) BASED ON RESOLUTION-LIMITED SMALL-SCALE CNN MODULES," by inventors Xing Wang, Him Wai Ng, Jie Liang, and filed on Nov. 30, 2016. The disclosures of the above application are incorporated by reference in their entirety as a part of this document.

TECHNICAL FIELD

The present disclosure generally relates to the field of machine learning and artificial intelligence, and more specifically to systems, devices and techniques for implementing convolutional neural networks (CNN) using resolution-limited small-scale CNN modules.

BACKGROUND

Deep learning (DL) is a branch of machine learning and artificial neural network based on a set of algorithms that attempt to model high level abstractions in data by using a deep graph with multiple processing layers. A typical DL architecture can include many layers of neurons and millions of parameters. These parameters can be trained from large amount of data on fast GPU-equipped computers, guided by novel training techniques that can work with many layers, such as rectified linear units (ReLU), dropout, data augmentation, and stochastic gradient descent (SGD).

Among the existing DL architectures, convolutional neural network (CNN) is one of the most popular DL architectures. Although the idea behind CNN has been known for more than 20 years, the true power of CNN has only been recognized after the recent development of the deep learning theory. To date, CNN has achieved numerous successes in many artificial intelligence and machine learning applications, such as image classification, image caption generation, visual question answering, and automatic driving cars.

However, the complexities of existing CNN systems remain quite high. For example, one of the best-known large-scale CNNs, AlexNet includes 60 millions of parameters and requires over 729 million FLOPs (FLoating-point Operations Per Second) to classify a single image, and the VGG network from Oxford University includes 19 layers and 144 millions of parameters, and the number of FLOPS involved to classify a single image is 19.6 billion. Unfortunately, implementing such high-complexity networks would often require significant amount of expensive hardware resources, such as Nvidia™ GPU cores and large-scale FPGAs. For example, the Nvidia™ TK1 chips used in some CNN systems cost at least US$80/chip, while the more powerful Nvidia™ TX1 chips cost at least US$120/chip. The cost issue can be particularly troublesome for embedded systems which often are subject to cost constraints. Moreover, these chips also require significantly more power to operate than the power constraints of traditional embedded platforms, thereby making them unsuitable for many applications where basic deep learning functionalities are required, but at the same time certain constraints on cost and power consumption should also be met.

Consequently, the existing CNN architectures and systems are not cost-effective for many embedded system applications.

SUMMARY

Embodiments described herein provide various examples of a convolutional neural network (CNN) constructed based on small-scale low-cost hardware CNN modules. The disclosed CNN architecture and system can be implemented in resource-limited embedded systems to allow these systems to perform tasks which would typically require large-scale expensive CNN systems. For example, the disclosed CNN architecture and system allows for using low-cost CNN-enabled embedded systems on high-complexity CNN applications, such as processing high-resolution input images which would otherwise not be feasible for resource-limited embedded systems.

Various embodiments of the disclosed CNN systems manage a complex task based on a divide-and-conquer approach. In some embodiments, a disclosed CNN system is constructed with two or more tiers/stages, wherein each of the two or more tiers/stages is implemented with either one or more small-scale low-cost hardware CNN modules or with software which operates on low-resolution inputs. As such, each of the two or more tiers/stages can have a very low-complexity. More specifically, to use the disclosed CNN system, an original high-resolution input image can be partitioned into a set of subimages of the same size or substantially the same size which is much smaller than the size of the original input image, wherein the partition can include properly designed gaps and/or overlaps between adjacent subimages. These subimages are sequentially fed into the first tier/stage of the disclosed CNN system which includes one or more small-scale hardware CNN modules designed to handle low-resolution input images. In this manner, a high-resolution input image can be processed by a given small-scale hardware CNN module by way of reusing the small-scale hardware CNN module repeatedly on the set of subimages. The outputs from the first tier/stage based on the set of subimages are subsequently merged. In some embodiments, the disclosed CNN system includes provisions to the sizes of the input images and subimages to ensure that the merged result to be substantially or exactly identical to the output of a large-scale CNN that processes the entire high-resolution input image without partition of the input image. Next, the merged result is processed by the second tier/stage of the disclosed CNN system, which can also be implemented with one or more low-complexity processing units. In this manner, the disclosed CNN system manages high-complexity tasks such as processing high-resolution input images without requiring large-scale expensive hardware modules, thereby improving trade-off between performance and cost.

In one aspect, a subimage-based convolutional neural network (CNN) system is disclosed. This CNN system includes a receiving module for receiving an input image of a first image size, and the receiving module can be used to partition the input image into a set of subimages of a second image size. The CNN system also includes a first processing stage that includes a first hardware CNN module configured with a maximum input image size. This first hardware CNN module is configured to sequentially receive each of the set of subimages and sequentially process each of the received subimages to generate a set of outputs. The CNN system further includes a merging module configured to sequentially receive the sets of outputs from the first processing stage and merge the sets of outputs into a set of merged feature maps. The CNN system additionally includes a second processing stage configured to receive the set of feature maps and process the set of feature maps to generate an output of the CNN system, and the output includes at least one prediction on the input image. In some embodiments, the first image size is significantly greater than the maximum input image size of the first hardware CNN module and the second image size is less than or equal to the maximum input image size of the first hardware CNN module.

In some embodiments, the set of subimages includes a first subset of subimages and a second subset of subimages. The receiving module is configured to partition the input image into the set of subimages by: partitioning the input image into the first subset of subimages of rows and columns separated by gaps, such that a pair of adjacent subimages in a row of the first subset of subimages is separated by a first gap, and a pair of adjacent subimages in a columns of the first subset of subimages is separated by a second gap; and generating the second subset of subimages such that each of the second subset of subimages is positioned to partially overlap with at least a pair of adjacent subimages in the first subset of subimages and over either the first gap or the second gap between the pair of adjacent subimages.

In some embodiments, the first hardware CNN module includes a set of convolution (CONV) layers, a set of ReLU layers, and a set of pooling layers coupled in series. Moreover, processing each of the received subimages using the first hardware CNN module includes alternatively applying a CONV layer in the set of CONV layers, an ReLU layer in the set of ReLU layers, and a pooling layer in the set of pooling layers on the received subimage.

In some embodiments, the first hardware CNN module also includes a set of filters, and the set of outputs associated with each of the processed subimages corresponds to the set of filters.

In some embodiments, the set of merged feature maps is substantially identical to a set of feature maps generated by convolution-ReLU-pooling layers of a large-scale CNN system which processes the input image as a whole without partitioning the input image.

In some embodiments, the second processing stage includes a set of fully-connected (FC) layers and a set of ReLU layers coupled in series. Moreover, processing the set of merged feature maps includes alternatively applying an FC layer in the set of FC layers and an ReLU layer in the set of ReLU layers on the set of merged feature maps.

In some embodiments, the second processing stage is implemented in software.

In some embodiments, the second processing stage is implemented in hardware with a second hardware CNN module.

In some embodiments, both the first hardware CNN module and the second hardware CNN module are implemented based on a small-scale hardware CNN module of an embedded system that includes a set of convolution layers, a first set of ReLU layers, a set of pooling layers, a set of fully-connected (FC) layers, and a second set of ReLU layers. Moreover, the first hardware CNN module is implemented by bypassing the set of FC layers and the second set of ReLU layers in the small-scale hardware CNN module; whereas the second hardware CNN module is implemented by bypassing the set of convolution layers, the first set of ReLU layers, and the set of pooling layers in the small-scale hardware CNN module.

In some embodiments, the first hardware CNN module is a small-scale low-cost hardware CNN module configured to process low-resolution input images for such applications as handwritten digit recognition and license plate recognition.

In another aspect, a process for performing image processing using a subimage-based CNN is disclosed. This process includes the steps of: receiving an input image of a first image size; partitioning the input image into a set of subimages of a second image size; processing the set of subimages using a first hardware CNN module configured with a maximum input image size, wherein the processing includes sequentially receiving each of the set of subimages and sequentially processing each of the received subimages to generate a set of outputs. This process further includes the steps of: merging the sets of outputs into a set of merged feature maps; and processing the set of feature maps to generate at least one prediction on the input image. In some embodiments, the first image size is significantly greater than the maximum input image size of the first hardware CNN module and the second image size is less than or equal to the maximum input image size of the first hardware CNN module.

In some embodiments, the set of subimages includes a first subset of subimages and a second subset of subimages and partitioning the input image includes: partitioning the input image into the first subset of subimages of rows and columns separated by gaps, such that a pair of adjacent subimages in a row of the first subset of subimages is separated by a first gap, and a pair of adjacent subimages in a columns of the first subset of subimages is separated by a second gap; and generating the second subset of subimages such that each of the second subset of subimages is positioned to partially overlap with at least a pair of adjacent subimages in the first subset of subimages and over either the first gap or the second gap between the pair of adjacent subimages.

In some embodiments, sequentially processing each of the received subimages includes alternatively applying a convolution layer in a set of convolution layers, an ReLU layer in a set of ReLU layers, and a pooling layer in a set of pooling layers on the received subimage.

In some embodiments, sequentially processing each of the received subimages further includes applying a set of filters on the received subimage, wherein the set of outputs associated with each of the processed subimages corresponds to the set of filters.

In some embodiments, the set of merged feature maps is substantially identical to a set of feature maps generated by convolution-ReLU-pooling layers of a large-scale CNN system which processes the input image as a whole without partitioning the input image.

In some embodiments, processing the set of merged feature maps includes alternatively applying an FC layer in a set of FC layers and an ReLU layer in a set of ReLU layers on the set of merged feature maps.

In some embodiments, processing the set of merged feature maps includes using a second hardware CNN module.

In yet another aspect, another subimage-based CNN system is disclosed. This CNN system includes a receiving module for receiving an input image of a first image size, and the receiving module can be used to partition the input image into a set of subimages of a second image size. The CNN system also includes a first processing stage that includes a first hardware CNN module and a second hardware CNN module, wherein each of the first and second hardware CNN modules is configured with a maximum input image size. The first hardware CNN module is configured to sequentially receive each of a first subset of the set of subimages and sequentially process each of received subimages to generate a first set of outputs. The second hardware CNN module is configured to sequentially receive each of a second subset of the set of subimages and sequentially process each of received subimages to generate a second set of outputs. In some embodiments, the first hardware CNN module and the second hardware CNN module are configured to process the first subset of subimages and the second subset of subimages in parallel. The CNN system further includes a merging module configured to sequentially receive the first sets of outputs and the second sets of outputs from the first processing stage and merge the first and second sets of outputs into a set of merged feature maps. The CNN system additionally includes a second processing stage configured to receive the set of feature maps and process the set of feature maps to generate an output of the CNN system, and the output includes at least one prediction on the input image.

In still another aspect, a system capable of performing deep learning on images is disclosed. This system includes a processor, a memory coupled to the processor, and an image capturing device coupled to the processor and the memory and configured to capture images of a first image size. This system also includes a CNN subsystem coupled to the processor and the memory. This CNN subsystem includes a receiving module for receiving an input image of the first image size captured by the image capturing device, and the receiving module is configured to partition the input image into a set of subimages of a second image size. The CNN subsystem also includes a first processing stage that includes a first hardware CNN module configured with a maximum input image size. This first hardware CNN module is configured to sequentially receive each of the set of subimages and sequentially process each of the received subimages to generate a set of outputs. The CNN subsystem further includes a merging module configured to sequentially receive the sets of outputs from the first processing stage and merge the sets of outputs into a set of merged feature maps. The CNN subsystem additionally includes a second processing stage configured to receive the set of feature maps and process the set of feature maps to generate an output of the CNN subsystem, and the output includes at least one prediction on the input image. In some embodiments, the first image size is significantly greater than the maximum input image size of the first hardware CNN module and the second image size is less than or equal to the maximum input image size of the first hardware CNN module.

In some embodiments, the system includes a mobile device such as a mobile phone or an embedded system such as a surveillance camera.

BRIEF DESCRIPTION OF THE DRAWINGS

The structure and operation of the present disclosure will be understood from a review of the following detailed description and the accompanying drawings in which like reference numerals refer to like parts and in which:

FIG. 2A shows a block diagram of a conventional full-image-based CNN system for processing higher-resolution input images.

FIG. 2B shows a block diagram of a disclosed subimage-based CNN system in accordance with some embodiments described herein.

FIG. 3A shows the partition of an input image into a set of four subimages with properly designed gaps between the adjacent subimages in accordance with some embodiments described herein.

FIG. 3B shows a process of generating a set of five boundary subimages for the same input image in accordance with some embodiments described herein.

FIG. 3C shows a combined set of subimages for the input image which includes both the subimages from FIG. 3A and the boundary subimages from FIG. 3B in accordance with some embodiments described herein.

DETAILED DESCRIPTION

Figure 1A:
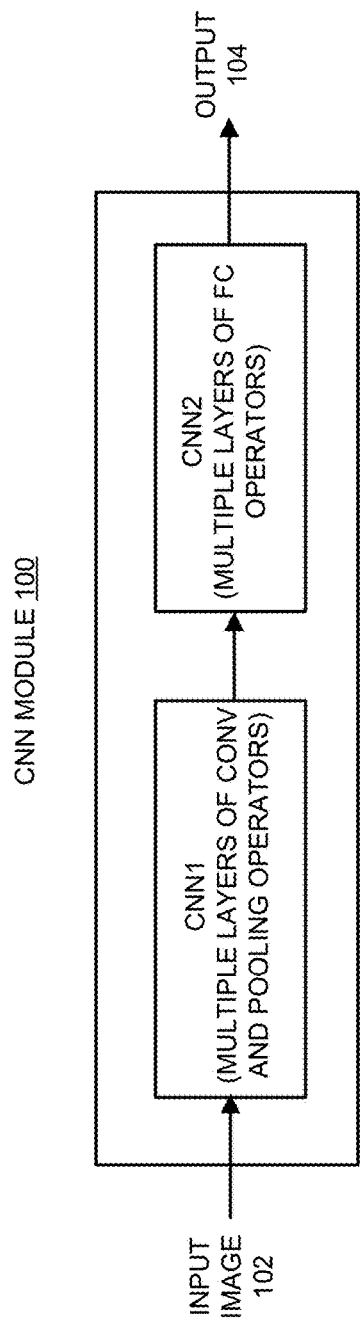
FIG. 1A shows a block diagram of a small-scale hardware CNN module for processing a low-resolution input image in accordance with some embodiments described herein.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

Embodiments described herein provide various examples of a convolutional neural network (CNN) constructed based on small-scale low-cost hardware CNN modules. The disclosed CNN architecture and system can be implemented in resource-limited low-cost systems to allow these systems to perform tasks which would typically require large-scale, high-complexity expensive CNN systems. The disclosed CNN architecture and system can also be implemented in existing DL systems to replace large-scale, high-complexity CNN modules to significantly reduce system cost. For example, the disclosed CNN architecture and system allows for using low-cost CNN-enabled embedded systems on high-complexity CNN applications, such as processing high-resolution input images which would otherwise not be feasible for resource-limited embedded systems.

Various embodiments of the disclosed CNN systems manage a complex task based on a divide-and-conquer approach. In some embodiments, a disclosed CNN system is constructed with two or more tiers/stages, wherein each of the two or more tiers/stages is implemented with either one or more small-scale low-cost hardware CNN modules or with software which operates on low-resolution inputs. As such, each of the two or more tiers/stages can have a very low-complexity. More specifically, to use the disclosed CNN system, an original high-resolution input image can be partitioned into a set of subimages of the same size or substantially the same size which is much smaller than the size of the original input image, wherein the partition can include properly designed gaps and/or overlaps between adjacent subimages. These subimages are sequentially fed into the first tier/stage of the disclosed CNN system which includes one or more small-scale hardware CNN modules designed to handle low-resolution input images. More specifically, the set of subimages can be processed sequentially by reusing a given small-scale hardware CNN module repeatedly on the set or a subset of the subimages. In this manner, a high-resolution input image can be processed by the one or more small-scale hardware CNN modules by way of reusing the one or more small-scale hardware CNN modules on the set of subimages. The outputs from the first tier/stage based on the set of subimages are subsequently merged. In some embodiments, the disclosed CNN system includes provisions to the sizes of the input images and subimages to ensure that the merged result to be substantially or exactly identical to the output of a large-scale high-complexity CNN module that processes the entire high-resolution input image without partition of the input image. Next, the merged result is processed by the second tier/stage of the disclosed CNN system, which can also be implemented with one or more low-complexity processing units. In this manner, the disclosed CNN system manages high-complexity tasks such as processing high-resolution input images without requiring large-scale, high-complexity, expensive hardware modules, thereby improving trade-off between performance and cost.

In one aspect, a subimage-based convolutional neural network (CNN) system is disclosed. This CNN system includes a receiving module for receiving an input image of a first image size, and the receiving module can be used to partition the input image into a set of subimages of a second image size. The CNN system also includes a first processing stage that includes a first hardware CNN module configured with a maximum input image size. This first hardware CNN module is configured to sequentially receive each of the set of subimages and sequentially process each of the received subimages to generate a set of outputs. The CNN system further includes a merging module configured to sequentially receive the sets of outputs from the first processing stage and merge the sets of outputs into a set of merged feature maps. The CNN system additionally includes a second processing stage configured to receive the set of feature maps and process the set of feature maps to generate an output of the CNN system, and the output includes at least one prediction on the input image. In some embodiments, the first image size is significantly greater than the maximum input image size of the first hardware CNN module and the second image size is less than or equal to the maximum input image size of the first hardware CNN module.

In another aspect, a process for performing image processing using a subimage-based CNN is disclosed. This process includes the steps of: receiving an input image of a first image size; partitioning the input image into a set of subimages of a second image size; processing the set of subimages using a first hardware CNN module configured with a maximum input image size, wherein the processing includes sequentially receiving each of the set of subimages and sequentially processing each of the received subimages to generate a set of outputs. This process further includes the steps of: merging the sets of outputs into a set of merged feature maps; and processing the set of feature maps to generate at least one prediction on the input image. In some embodiments, the first image size is significantly greater than the maximum input image size of the first hardware CNN module and the second image size is less than or equal to the maximum input image size of the first hardware CNN module.

In yet another aspect, another subimage-based CNN system is disclosed. This CNN system includes a receiving module for receiving an input image of a first image size, and the receiving module can be used to partition the input image into a set of subimages of a second image size. The CNN system also includes a first processing stage that includes a first hardware CNN module and a second hardware CNN module, wherein each of the first and second hardware CNN modules is configured with a maximum input image size. The first hardware CNN module is configured to sequentially receive each of a first subset of the set of subimages and sequentially process each of received subimages to generate a first set of outputs. The second hardware CNN module is configured to sequentially receive each of a second subset of the set of subimages and sequentially process each of received subimages to generate a second set of outputs. In some embodiments, the first hardware CNN module and the second hardware CNN module are configured to process the first subset of subimages and the second subset of subimages in parallel. The CNN system further includes a merging module configured to sequentially receive the first sets of outputs and the second sets of outputs from the first processing stage and merge the first and second sets of outputs into a set of merged feature maps. The CNN system additionally includes a second processing stage configured to receive the set of feature maps and process the set of feature maps to generate an output of the CNN system, and the output includes at least one prediction on the input image.

In still another aspect, a system capable of performing deep learning (DL) on images is disclosed. This system includes a processor, a memory coupled to the processor, and an image capturing device coupled to the processor and the memory and configured to capture images of a first image size. This system also includes a CNN subsystem coupled to the processor and the memory. This CNN subsystem includes a receiving module for receiving an input image of the first image size captured by the image capturing device, and the receiving module is configured to partition the input image into a set of subimages of a second image size. The CNN subsystem also includes a first processing stage that includes a first hardware CNN module configured with a maximum input image size. This first hardware CNN module is configured to sequentially receive each of the set of subimages and sequentially process each of the received subimages to generate a set of outputs. The CNN subsystem further includes a merging module configured to sequentially receive the sets of outputs from the first processing stage and merge the sets of outputs into a set of merged feature maps. The CNN subsystem additionally includes a second processing stage configured to receive the set of feature maps and process the set of feature maps to generate an output of the CNN subsystem, and the output includes at least one prediction on the input image. In some embodiments, the first image size is significantly greater than the maximum input image size of the first hardware CNN module and the second image size is less than or equal to the maximum input image size of the first hardware CNN module.

As mentioned above, the existing CNN architectures and systems are not cost-effective for many embedded system applications. Meanwhile, some low-cost CNN-enabled embedded systems based on low-cost chipsets have started to emerge. One notable example is the Hi3519 chipset developed by HiSilicon Semiconductor Co. Ltd., a subsidiary of Huawei Technologies Co. Ltd. The cost of Hi3519 chipset is significantly lower than Nvidia™ TK1/TX1 chipsets. Hi3519 chipset also includes a built-in hardware CNN module with some promising features. For example, the parameters of the built-in CNN module in Hi3519 chipset are reconfigurable, i.e., users can modify the network architecture and the parameters, which can be pre-trained for different applications. Moreover, this built-in CNN module can be extremely fast, e.g., it would take about 1 ms to process a 32×40 input image. However, Hi3519 chipset has a very limited computational capacity, and therefore can only be used for simple applications such as handwritten digit recognition or license plate recognition.

In the present disclosure, a novel CNN architecture and system suitable for resource-limited systems, such as embedded systems and mobile devices is disclosed. In some embodiments, the disclosed CNN architecture and system reuses one or more small-scale hardware CNN modules which are designed to process input images of lower resolutions (hence also referred to as "resolution-limited CNN modules" hereinafter), such as the aforementioned built-in hardware CNN module within Hi3519 chipset, so that the proposed CNN architecture and system can be applied to higher-resolution input images and more challenging tasks which typically require the processing power of expensive and large-scale hardware CNN modules.

The disclosed CNN system is a tiered system which is configured to manage a complex task based on a divide-and-conquer approach. In some embodiments, a disclosed CNN system is constructed with two or more tiers/stages. Each of the two or more stages can be implemented with one or more small-scale low-cost hardware CNN modules (typically found in embedded systems) by reusing each of the one or more small-scale hardware CNN modules. As such, each of the two or more tiers/stages can have a very low-complexity. More specifically, to use the disclosed CNN system, an original high-resolution input image can be partitioned into a set of subimages of the same size or substantially the same size which is much smaller than the size of the original input image, wherein the partition can include properly designed gaps and/or overlaps between adjacent subimages. These subimages are sequentially fed into the first stage of the disclosed CNN system which includes at least one small-scale low-cost hardware CNN module designed to handle low-resolution input images, and the outputs from the first tier of the processed set of subimages are subsequently merged. More specifically, the set of subimages can be processed sequentially by reusing the at least one small-scale hardware CNN module repeatedly on the set of subimages. In this manner, a high-resolution input image can be processed by the small-scale hardware CNN module by way of reusing the at least one small-scale hardware CNN module on the set of subimages. With the properly selected sizes of the original input images and the subimages, the merged result can be substantially or exactly identical to the output of a large-scale high-complexity CNN module that processes the entire high-resolution input image without partition. Next, the merged result is processed by the second stage of the disclosed CNN system, which can be based on either one or more resolution-limited small-scale hardware CNN modules or software. This proposed tiered CNN system essentially builds a large-scale high-complexity CNN system by reusing one or more small-scale low-complexity hardware CNN modules, making the proposed CNN system applicable to low-cost resource-limited systems, such as various surveillance cameras, machine vision cameras, drones, robots, self-driving cars, and mobile phones.

In the following discussion, we may use the built-in hardware CNN module within Hi3519 chipset as an example to illustrate some exemplary implementations of the proposed tiered CNN system. However, it should be noted that the proposed CNN systems and techniques are not limited to a particular chipset, such as Hi3519 chipset. The disclosed concept of reusing small-scale low-cost hardware CNN modules for high-complexity DL and AI applications can be applied to any small-scale low-cost hardware CNN modules. Moreover, the disclosed systems and techniques can be implemented as a single field programmable gate array (FPGA) module, and integrated with many low-cost embedded platforms.

A Small-Scale Low-Cost Hardware CNN Module

FIG. 1A shows a block diagram of a small-scale hardware CNN module 100 for processing a low-resolution input image in accordance with some embodiments described herein. In some embodiments, the CNN module 100 is configured to extract features of a resolution-limited input image and make various DL inferences, depending on the applications. As can be seen in FIG. 1A, CNN module 100 includes at least two submodules, denoted as CNN1 and CNN2. In some embodiments, CNN module 100 is configured to limit the input image 102 size to no more than 1280 pixels, for example, an image resolution of 32×40 pixels. This limitation on the input image sizes also significantly limits the types of applications which are suitable for CNN module 100.

Figure 1B:
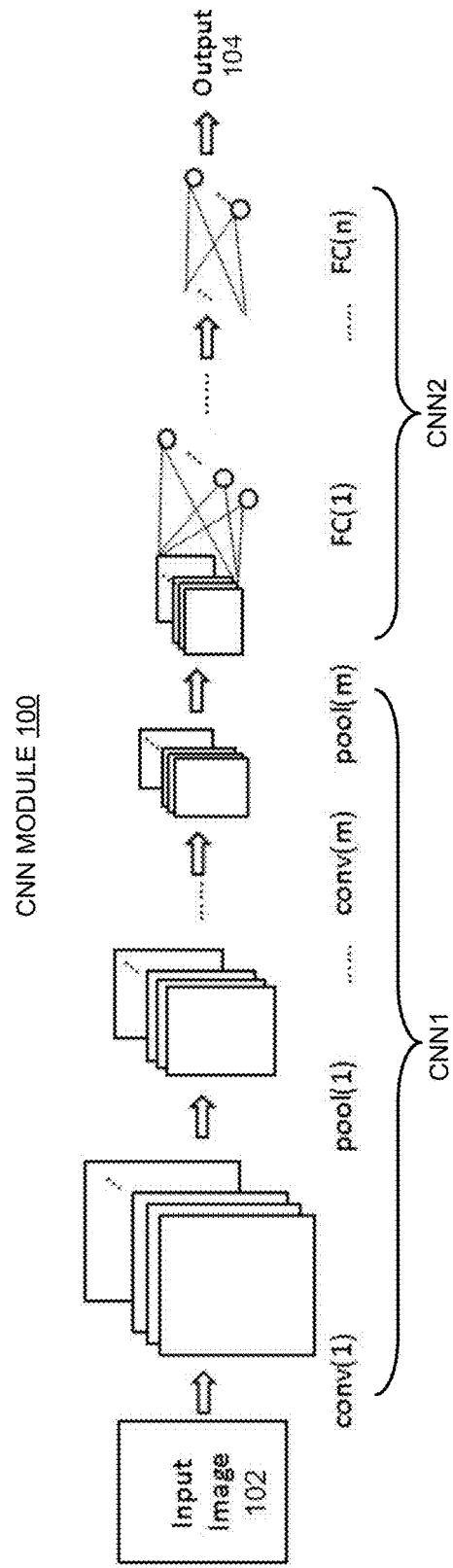
FIG. 1B shows a more detailed implementation of the hardware CNN module in FIG. 1A in accordance with some embodiments described herein.

FIG. 1B shows a more detailed implementation of hardware CNN module 100 in accordance with some embodiments described herein. As can be seen in FIG. 1B, the first submodule CNN1 in FIG. 1A further includes multiple alternating convolution (CONV) layers, rectified linear unit (ReLU) layers (not shown) and pooling layers coupled in series. Moreover, for each of the CONV layers, such as CONV(1) layer, a set of convolution filters are employed to extract a set of particular features from input image 102. Each of the CONV layers in the submodule CNN1 is followed by a corresponding ReLU layer (not shown) and pooling layer, such as POOL(1) layer, which is configured to reduce the size of the filtered images generated by the corresponding CONV layer, while preserving some of the extracted features.

Also shown in FIG. 1B, the second submodule CNN2 in FIG. 1A further includes multiple alternating fully-connected (FC) layers and ReLU layers (not shown) coupled in series. Each of the FC layers, such as FC(1) layer, in the submodule CNN2 is configured to perform matrix multiplications. Each of the FC layers (except for the last FC layer) is followed by a corresponding ReLU layer (not shown). Although not explicitly shown in FIG. 1B, each of the ReLU layers in CNN1 and CNN2 is configured to provide nonlinear characteristics to the CNN system. Finally, at the output of the last FC layer (e.g., FC(n) layer), a decision module (also not shown) is configured to make a prediction based on the output of the last FC layer, thereby generating the output 104 of the CNN module 100. In some embodiments, the first submodule CNN1 includes 1~8 CONV, ReLU, and pooling layers, while the second submodule CNN2 includes 3~8 fully-connected (FC) layers and ReLU layers.

In some embodiments, the number of convolution filters in each of the CONV layers is at most 50, and only 3×3 filters are allowed. Moreover, the convolution stride is fixed to be 1, and no zero padding is used. In some embodiments, the pooling layers in CNN1 can use a max-pooling technique to select the maximum value from each of the 2×2 regions in the filter images. In some embodiments, both max-pooling and average pooling are supported, but the pooling window size is fixed to 2×2, and the stride is fixed to 2. In other words, each of the image width and height is reduced by one half after each pooling layer.

For the example of the hardware CNN module within Hi3519 chipset, the maximum input dimension for the first FC layer is 1024, and the number of neurons in the middle FC layers is at most 256. The dimension of the CNN module output is at most 256. Due to these constraints, the hardware CNN module within Hi3519 chipset is typically only suitable for performing simple applications such as handwritten digit recognition and license plate recognition. For more challenging applications such as face recognition, directly applying a small-scale CNN module such as CNN module 100 would be infeasible at least because of the following reasons. First, the maximum input resolution of 1280 pixels (such as 40×32) is very restrictive, because a face image down-sampled to this resolution loses too much important facial information. Second, the learning capacity of the small CNN module 100 is also extremely limited.

A Tiered Subimage-Based CNN Architecture and System

FIG. 2A shows a block diagram of a conventional full-image-based CNN system 200 for processing high-resolution input images. As can be seen, conventional CNN system 200 can receive an entire high-resolution input image 202 at the first convolution layer CONV(1) and start performing feature extraction operations on the high-resolution input image 202. As such, conventional CNN system 200 can directly process the full high-resolution input image 202 without partitioning the input image. However, conventional CNN system 200 also requires using large-scale expensive chips capable of handling such high-resolution input images, such as aforementioned Nvidia™ chips.

FIG. 2B shows a block diagram of a disclosed subimage-based CNN system 210 in accordance with some embodiments described herein. In the disclosed CNN system 210, a resolution-limited small-scale CNN module, such as CNN module 100 described in conjunction with FIGS. 1A and 1B or the hardware CNN module inside Hi3519 chipset can be used as a building block of subimage-based CNN system 210. As mentioned above, such a small-scale CNN module has a limitation on the maximum input image size, e.g., up to 1280 pixels. To be able to use this small-scale CNN module on a high-resolution input image 202 (e.g., an image having >1280 pixels), the disclosed CNN system 210 includes an input module 212 which is configured to partition the high-resolution input image 202 into a set of smaller subimages 204, wherein each of the subimages 204 has a size which is less than or equal to the maximum input image size allowed by the small-scale CNN module used as a building block of CNN system 210. In some embodiments, input module 212 is configured to partition the high-resolution input image 202 by including proper gaps and overlaps between the adjacent subimages 204, as shown in FIG. 2B. Note that the set of four subimages 204 in two rows and two columns with the illustrated gaps and overlaps are shown in FIG. 2B for the convenience of understanding the concept and not meant for representing an actual partition. Some examples of input image partitioning and considerations for choosing proper gaps and overlaps are provided below.

As shown in FIG. 2B, CNN system 210 includes a two-tiered processing structure based on using and/or reusing one or both of the two hardware submodules CNN1 and CNN2 of small-scale CNN module 100 described in FIGS. 1A and 1B. In addition to the input module 212, CNN system 210 also includes a first processing stage 220, a merging module 222 and a second processing stage 224. More specifically, first processing stage 220 of CNN system 210 includes at least one CNN1 processing module, such as CNN1 module 214. In some embodiments, CNN1 module 214 is implemented by the hardware submodule CNN1 described in FIGS. 1A and 1B. In other embodiments, CNN1 module 214 is implemented by the entire CNN module 100 described in FIGS. 1A and 1B which includes both CNN1 and CNN2 submodules. Note that the multiple instances of CNN1 module 214 shown within the first processing stage 220 represent the same CNN1 module 214 being used at different times $t_1, t_2, t_3, \ldots,$ and $t_n$ as indicated for each such instance. Consequently, "CNN1 214 at $t_1$," "CNN1 214 at $t_2$," "CNN1 214 at $t_3$," ..., and "CNN1 214 at $t_n$," shown in FIG. 2B correspond to a single CNN1 module 214 at different processing times and should not be interpreted as multiple CNN1 modules having the same numeral 214. Although not shown, the first processing stage 220 can include additional CNN1 modules similar to CNN module 214. For example, the first processing stage 220 can include two or more identical CNN1 modules.

The second processing stage 224 of CNN system 210 includes at least one CNN2 module 216. In some embodiments, CNN2 module 216 is implemented by the hardware submodule CNN2 described in FIGS. 1A and 1B. In other embodiments, CNN2 module 216 is implemented by the entire CNN module 100 described in FIGS. 1A and 1B which includes both CNN1 and CNN2 submodules. In some other embodiments, CNN2 module 216 within the second processing stage 224 can be implemented by software instead of hardware.

Specifically, to process the set of subimages 204 generated by input module 212, single CNN1 module 214 is used multiple times by sequentially processing the set of subimages 204, one subimage at a time. That is, each instance of CNN1 block 214 within the first processing stage 220 of CNN system 210 represents one of the multiple applications of the same CNN1 module 214 on one of the set of subimages 204 at a different processing time. However, because the processing speed of each subimage 204 by CNN1 module 214 can be very fast, the overall processing time for processing the set of subimages 204 also can be quite fast. The outputs of multiple applications of CNN1 module 214 contain an array of feature maps 206 corresponding to the set of subimages 204 after multiple layers of convolution, ReLU, and pooling operations.

Note that although the embodiment shown in FIG. 2B is based on reusing a single hardware CNN1 module 214 in the first processing stage 220 of CNN system 210, other embodiments can use additional hardware CNN1 modules similar or identical to CNN1 module 214 in the first processing stage 220 of CNN system 210, so that the set of subimages 204 can be processed in parallel by the multiple hardware CNN1 modules. The actual number of CNN1 modules used by a given design can be determined based on the trade-off between hardware cost constraint and speed requirement. For example, some variations to CNN system 210 can include 3 to 5 CNN1 modules in the first processing stage.

As mentioned above, CNN1 module 214 can be implemented by either a dedicated hardware submodule CNN1 such as those described in conjunction with FIGS. 1A and 1B or by the entire CNN module 100 described in conjunction with FIGS. 1A and 1B which includes both CNN1 and CNN2 submodules. In the first scenario, CNN1 module 214 within CNN system 210 can include only CONV, ReLU, and pooling layers. In the second scenario, implementing CNN1 module 214 in CNN system 210 further includes bypassing the FC layers and the corresponding ReLU layers, i.e., bypassing the submodule CNN2 within CNN module 100. When bypassing the CNN2 submodule, it is necessary for the CNN1 module 214 to preserve the spatial location information in its output feature maps, because the outputs from the CNN1 module 214 will be merged for further processing. For some built-in hardware CNN modules, such as a hardware CNN module within Hi3519 chipset, the parameters of the built-in CNN module are reconfigurable. Using this property, bypassing the submodule CNN2 when such a built-in hardware CNN module is used can be achieved by forcing each of the FC layers within CNN module 100 to be an identity matrix, so that the output from each of the FC layer is simply a reorganization of the two-dimensional feature maps into a one-dimensional vector. The ReLU layer after each FC layer can be applied as usual. In a partition embodiment, for a three FC-ReLU-layer CNN2 submodule configuration, the last two ReLU layers do not change any data, because the concatenation of multiple ReLU layers is equivalent to just one ReLU layer.

Referring back to FIG. 2B, after sequentially applying CNN1 module 214 to each of the set of subimages 204, the outputs from CNN1 module 214 containing the array of feature maps 206 become the inputs to merging module 222 which is configured to merge the array of feature maps 206 to form the full feature maps of the entire input image 202. The merged feature maps can then be used as the inputs to the second processing stage 224 of CNN system 210. In some embodiments, the output 228 from the second processing stage 224 is the output from the last FC layer of CNN2 module 216. Ideally, output 228 is identical to the output 226 of the conventional CNN system 200 in FIG. 2A.

In some embodiments, the array of feature maps 206 includes a set of three-dimensional (3D) matrices (i.e., two dimensions for a given feature map and one dimension for the number of feature maps). For example, the array of feature maps 206 can be composed of nine (i.e., a 3×3 array of) 3D matrices of 2×2×48 sizes, wherein nine is the number of subimages 204 having indices of 0, 1, 2, . . . , 8 (i.e., subimages of 3 rows by 3 columns), 2×2 is the size of a single output feature map after CNN1 module 214 for each subimage, and 48 is the number of feature maps for each subimage. In some embodiments, merging module 222 is configured to merge the array of feature maps 206 by concatenating the set of 3D output matrices based on the corresponding indices to form a merged 3D feature-map matrix, while preserving the spatial relationships of the set of subimages 204. In the above example, this step generates a 3D matrix of 6×6×48. Next, the merged 3D matrix can be flattened into a one-dimensional (1D) vector. In the above example, this creates a 1D vector having a size of 1728. Finally, the flattened 1D vector is fed into the second processing stage 224.

FIG. 2B shows that the merged feature maps 208 generated by merging module 222 are fed into the second processing stage 224 of CNN system 210 for further processing. More specifically, the second processing stage 224 of CNN system 210 includes at least one CNN2 module 216, which further includes a set of FC layers and ReLU layers as described above. As mentioned above, CNN2 module 216 in CNN system 210 can be implemented by a dedicated hardware submodule CNN2 described in conjunction with FIGS. 1A and 1B. In these embodiments, CNN2 module 216 within CNN system 210 can include only FC layers and ReLU layers. In some embodiments, CNN2 module 216 can be implemented by taking an entire hardware CNN module 100 described in FIGS. 1A and 1B which includes both CNN1 and CNN2 submodules. In these embodiments, implementing CNN2 module 216 in CNN system 210 further includes bypassing the CONV-ReLU-pooling layers, i.e., bypassing the submodule CNN1 within CNN module 100. In some systems such as Hi3519, it may be difficult to bypass the CONV-ReLU-pooling layers to use the FC layers and ReLU layers directly. In these cases, CNN2 module 216, i.e., the FC layers and ReLU layers can be implemented by software. Because most of the computational complexity of CNN system 210 is in the CONV layers, implementing the FC and ReLU layers in software typically has minor effect on the overall speed of the system. Furthermore, systems such as Hi3519 also provide additional tools to optimize the speed of such a software implementation.

As mentioned above, CNN2 module 216 within the second processing stage 224 can be implemented by software instead of a hardware CNN module. Note that most of the computational complexity of CNN system 210 is in the convolution layers implemented by CNN1 module 214 because the complexity of the FC layers and ReLU layers are generally much lower than the convolution layers. As a result, the low computational complexity operations implemented by the hardware CNN2 module 216 in CNN system 210 can be implemented by software in place of hardware CNN2 or CNN modules mentioned above. Moreover, such a software approach can provide more flexibilities than the embodiments based on the hardware CNN modules.

Although the disclosed subimage-based CNN system 210 is constructed as a two-tiered system including the first stage based on one or more CNN1 modules and the second stage based on a CNN2 module, other embodiments of the disclosed subimage-based CNN system can include more than two tiers. For example, FIG. 2C shows a block diagram of a three-tiered subimage-based CNN system 230 in accordance with some embodiments described herein.

Figure 2C:
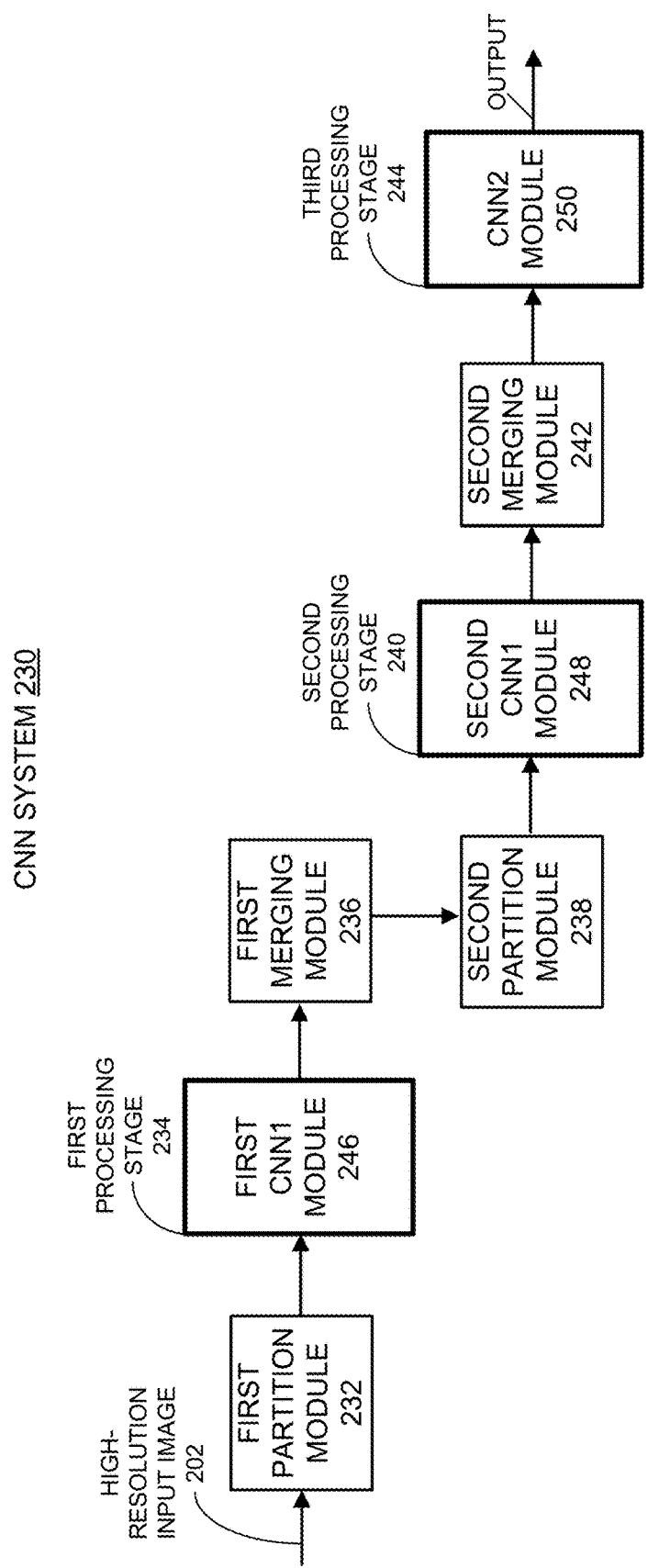
FIG. 2C shows a block diagram of a three-tiered subimage-based CNN system in accordance with some embodiments described herein.

As can be seen in FIG. 2C, the 3-tiered CNN system 230 includes a first partition module 232, a first processing stage 234, a first merging module 236, a second partition module 238, a second processing stage 240, a second merging module 242, and a third processing stage 244. Moreover, the first processing stage 234 includes a first CNN1 module 246, the second processing stage 240 following the first the first processing stage includes a second CNN1 module 248, and the third processing stage 244 following the second processing stage includes a CNN2 module 250.

In one embodiment, a high-resolution input image 202 can be first partitioned into a set of subimages by the first partition module 232 which is subsequently processed by the first CNN1 module 246. In some embodiments, the outputs from the first processing stage 234 are merged by the first merging module 236 into a first set of feature maps, which has a size greater than the maximum input size allowed by the CNN2 module 250 in the third processing stage 244. Hence, the merged feature maps generated by merging module 236 are again partitioned into a second set of subimages by the second partition module 238 which is subsequently processed by the second CNN1 module 248. The outputs from the second processing stage 240 are merged by the second merging module 242 into a second set of feature maps satisfying the input size requirement of the CNN2 module 250, which is then fed into the CNN2 module 250 of the third processing stage 244 for further processing. Although the 3-tiered CNN system 230 is described to have two CNN1 stages and one CNN2 stage, other implementations of 3-tiered CNN systems can have different processing module configurations within each of the three processing stages without departing from the scope of the present disclosure.

Referring back to FIG. 2B, ideally, the feature maps generated before the first FC layer from processing the entire high-resolution input image 202 by large-scale CNN system 200 of FIG. 2A and the merged feature maps 208 generated from processing the set of subimages 204 by the CNN1 module 214 are identical or substantially identical to each other. In reality, if all of the subimages 204 are processed independently, there would be no convolution operations performed across the boundaries of these subimages. This can lead to a problem that the features at subimage boundaries are not captured properly.

The above-described boundary effect is similar to the blocking artifact in DCT-based image coding. In the field of image coding, the blocking artifact can be resolved by applying filters across the image block boundaries, referred to as a "lapped transform." The concept of lapped transform is described in more detail in T. D. Tran, et al., "Lapped transform via time-domain pre/post-processing," IEEE Trans. Signal Processing, vol. 51, No. 6, pp. 1557-1571, June 2003. In some embodiments, the concept of the lapped transform can be applied to CNN system 210 to mitigate the aforementioned boundary effect. This "lapped transform" technique can include generating an additional set of boundary subimages across the boundaries of the set of subimages and applying the first processing stage 220 of CNN system 210 to both the set of subimages and the set of boundary subimages.

FIGS. 3A-3C illustrate an exemplary process of partitioning an input image into a set of subimages and also generating a set of boundary subimages for mitigating the boundary effect in accordance with some embodiments described herein. In some embodiments, the exemplary partition shown in FIGS. 3A-3C can be performed by input module 212 within CNN system 210 or by the first and second partition modules 232 and 238 within CNN system 230.

More specifically, FIG. 3A shows the partition of an input image 300 into a set of four subimages 302 with properly designed gaps 308 and 310 between adjacent subimages 302 in accordance with some embodiments described herein. In some embodiments, the set of subimages 302 are images having the same size. FIG. 3B shows a process of generating a set of five boundary subimages 304 for the same input image 300 in accordance with some embodiments described herein. As can be seen in FIG. 3B, each of the boundary subimages 304 is positioned to overlap with the boundaries of at least two adjacent subimages 302 shown in FIG. 3A. Note that one of the boundary subimages 304 is positioned substantially in the center of input image 300, while the other four boundary subimages are located to the left, to the right, above, and below the center boundary subimage 304. Also note that subimages 302 and boundary subimages 304 can have the same size. Moreover, four dashed lines 310, 312, 324, and 316 are intentionally placed in FIG. 3B to mark and extend the four edges of the center boundary subimage 304. Note that dashed lines, rounded corners and different line widths are used to illustrate boundary subimages 304 which are merely for the purposes of distinguishing and easiness of visualizing these boundary subimages due to the overlapping nature of these subimages. Hence, the rounded corners of boundary subimages 304 as shown in FIG. 3B have nothing to do with the actual geometries of subimage 304. In other words, each of boundary subimages 304 remains a region of 2D-array of pixels.

FIG. 3C shows a combined set of subimages for input image 300 which includes both the set of four subimages 302 from FIG. 3A and the set of five boundary subimages 304 from FIG. 3B in accordance with some embodiments described herein (input image 300 not shown). Note that in FIG. 3C, the set of four subimages 302 are shown with solid lines and straight corners while the set of five boundary subimages 304 are shown with dashed lines and rounded corners. Also, different line widths are used for the set of four subimages 302, the set of four boundary subimages 304 along the edges and the single subimage 304 in the middle. In the particular embodiment shown, all nine of the subimages have the same image size.

FIG. 3C clearly shows how each of the boundary subimages 304 is positioned across the boundary regions of subimages 302. Note that the set of nine subimages has also been indexed from "0" to "8." Next, when processing input image 300 using the disclosed CNN system 210, CNN1 module 214 can be applied to both the set of subimages 302 and the set of boundary subimages 304 in a sequential order. Hence, the outputs from the first processing stage 220 of CNN system 210 include both feature maps associated with subimages 302 and feature maps associated with boundary subimages 304. In some embodiments, all of these feature maps are merged to form a set of merged feature maps for the entire input image 300 which are free of the above-mentioned boundary effect. A detailed example of processing an input image with boundary-effect correction using CNN system 210 is provided below in conjunction with FIG. 4.

Referring back to FIG. 2B, note that if CNN1 module 214 of the first processing stage 220 includes only convolution operators, it is possible to apply a conventional overlap-and-add approach to the subimages 204 and still avoid the boundary artifacts. However, due to the pooling operators in CNN1 module 214, the results of the overlap-and-add approach are typically not equivalent to the above-described lapped-transform technique which applies convolutions across the subimage boundaries. In the discussion below, we derive the conditions and solutions for achieving the equivalency between the conventional full image-based CNN system 200 and the subimage-based CNN system 210.

Conditions and Solutions for Equivalent Convolution and Pooling Operations

In some embodiments, to achieve equivalent results of convolution and max-pooling operations between the conventional full-image-based CNN system 200 and the subimage-based CNN system 210, two conditions should be met: (1) the boundary effect of convolution operations in CNN system 210 should be avoided as described above; and (2) the input image size to each max-pooling operator in both systems should be an even number. This is because in the global approach, an input to the max-pooling operator is typically a 2×2-pixel region, except at the image boundaries. As a result, it is necessary to ensure that an input to the max-pooling operator in the subimage-based approach is also a 2×2-pixelregion, even at the subimage boundaries, so as to avoid mismatch between the two approaches.

In the following discussion on feasible image sizes for equivalency, we focus on an exemplary implementation of subimage-based CNN system 210 that includes three layers of convolutions and max-pooling operators, 3×3 convolution filters, and 2×2 max-pooling sizes. However, the discussion based on such a system configuration can be easily extended to systems having more convolution and pooling layers. Note that, the ReLU layers within a CNN1 module of this exemplary implementation do not need to be considered here because an ReLU layer typically does not affect the image size.

Suppose K is the number of rows or columns of an input image. After the first convolution layer, there will be K+2 output coefficients with zero padding. Among the K+2 output coefficients, only K−2 coefficients are not affected by the boundary effect (because the convolution filter has 3 taps in each direction). These output coefficients will be sent to the first max-pooling operator, and the result after the pooling operation has (K−2)/2 coefficients. Hence, to avoid boundary effect, we need K−2 to be an even number. That is, $$K-2=2x_1 \rightarrow K=2x_1+2, \quad (1)$$

wherein $x_1$ is a positive integer.

In the second layer, the size after the convolution operation will be (K−2)/2−2, which should also be an even number, i.e., $$(K-2)/2-2=2x_2 \rightarrow K=4x_2+6, \quad (2)$$

wherein $x_2$ is another positive integer.

After the second max-pooling operation, the size of the processed image is reduced to (K−2)/4−1. Similarly, in the third layer, the size of the processed image after the convolution operation will be (K−2)/4−3, which should still be an even number. That is, $$(K-2)/4-3=2x_3 \rightarrow K=8x_3+14, \quad (3)$$

wherein $x_3$ is also a positive integer.

It can be verified that the feasible solutions for K given by Eq. (3) are a subset of the solutions for Eq. (2), and the latter are a subset of that of Eq. (1). As a result, solutions for Eq. (3) can meet all three constraints in Eq. (1) to Eq. (3). If there are more than three layers within CNN1 module 214, it can be shown that the solutions are also given by the constraint from the last layer, which is also a subset of the feasible solutions of all of the previous layers. Hence, the feasible solutions still exist.

It can be seen from Eq. (3) that feasible image sizes differ by multiple of 8. This is the result of the three layers of pooling operations, which downsample the image sizes by a factor of 8. The first few feasible solutions given by Eq. (3) can include K=22, 30, 38, and 46. Using Hi3519 chipset as an example, because the maximum number of input pixels for the embedded CNN module within Hi3519 is 1280, the closest subimage dimension is thus 38×30 (i.e., having 1140 pixels). For this choice, the size after the first convolution operator is 36×28. After the first max-pooling operator, the size becomes 18×14. After the second convolution and max-pooling operators, the size becomes 16×12 and 8×6 respectively. Finally, the size reduces to 6×4 after the third convolution operator, and the final output is 3×2 after the third max-pooling operator.

On the other hand, the size of the entire input image should also meet Eq. (3). This means that by simply dividing an input image into some side-by-side subimages cannot guarantee the equivalency between the global convolution and pooling approach of conventional CNN system 200 and the subimage-based technique of CNN system 210, even if the size of each subimage meets Eq. (3). For example, an image of size 76×60 cannot achieve the same results between the global CNN approach and the subimage-based CNN technique, because the numbers 76 and 60 do not satisfy Eq. (3), even though the input image can be divided into four subimages of 38×30 pixels.

In some embodiments, to achieve both feasible subimage size and entire input image size for equivalency, some extra pixels used as gaps should be included between neighboring subimages in the subimage-based technique. For the example above, the closest feasible solution is 78×62, i.e., there are two extra pixels used as gaps between two neighboring subimages, both in the horizontal direction and the vertical direction. However, other embodiments of the input image partitions can use gaps greater than 2, so long as the entire image size satisfies Eq. (3). These extra pixels between neighboring subimages can be filtered by some special subimages that straddle the boundaries of neighboring subimages, in order to achieve the same result as the global convolution approach of CNN system 200. As described above, this technique of using boundary subimages is similar to the pre/post-filter in the lapped transform. The convolution and pooling results of these boundary subimages can be merged with the convolution and pooling outputs of other subimages.

Another common constraint of many hardware CNN modules is that when FC layers are employed, once the network is trained for a specific application, it would typically only support a fixed input image size. As a result, all subimages, including those that straddle neighboring subimages (e.g., subimages 304 in FIG. 3), should have the same size, for example, 38×30. With this additional constraint, it is necessary to choose suitable gaps between neighboring subimages to simplify the merge of outputs from different subimages (e.g., no gap or overlap in the merged result).

Because the output of each 38×30 subimage is 3×2 after three layers of convolution and pooling operators, it is necessary to choose the gaps such that the outputs of two overlapped subimages (e.g., subimage 302(0) in the upper left corner and boundary subimage 304(4) in the upper middle of the partition map in FIG. 3) are shifted by 3 vertically and by 2 horizontally. In this manner, the outputs of these overlapping subimages, such as subimage 302(0) and boundary subimage 304(4) of the partition map in FIG. 3 become adjacent feature maps without either overlap or gap between them. Otherwise there will be gaps in the outputs and therefore cannot ensure equivalency, or there will be duplicated outputs, which lead to the waste of the computing resource.

Because each pooling layer reduces the subimage size by one half, each output after three pooling layers corresponds to 8 input pixels. As a result, in order for the output to shift by 2 and 3 respectively, we need to shift the subimage by 16 and 24 pixels respectively. Therefore, to avoid any gap or duplication in the output, the aforementioned image size of 78×62 can be adjusted to 86×62, wherein 86=38+24×2, and 62=30+16×2. In other words, the gap between horizontal subimages can be 2 pixels, and the gap between vertical subimages can be 10 pixels. Such resolution can lead to reasonable accuracy for challenging tasks such as face recognition.

Figure 4:
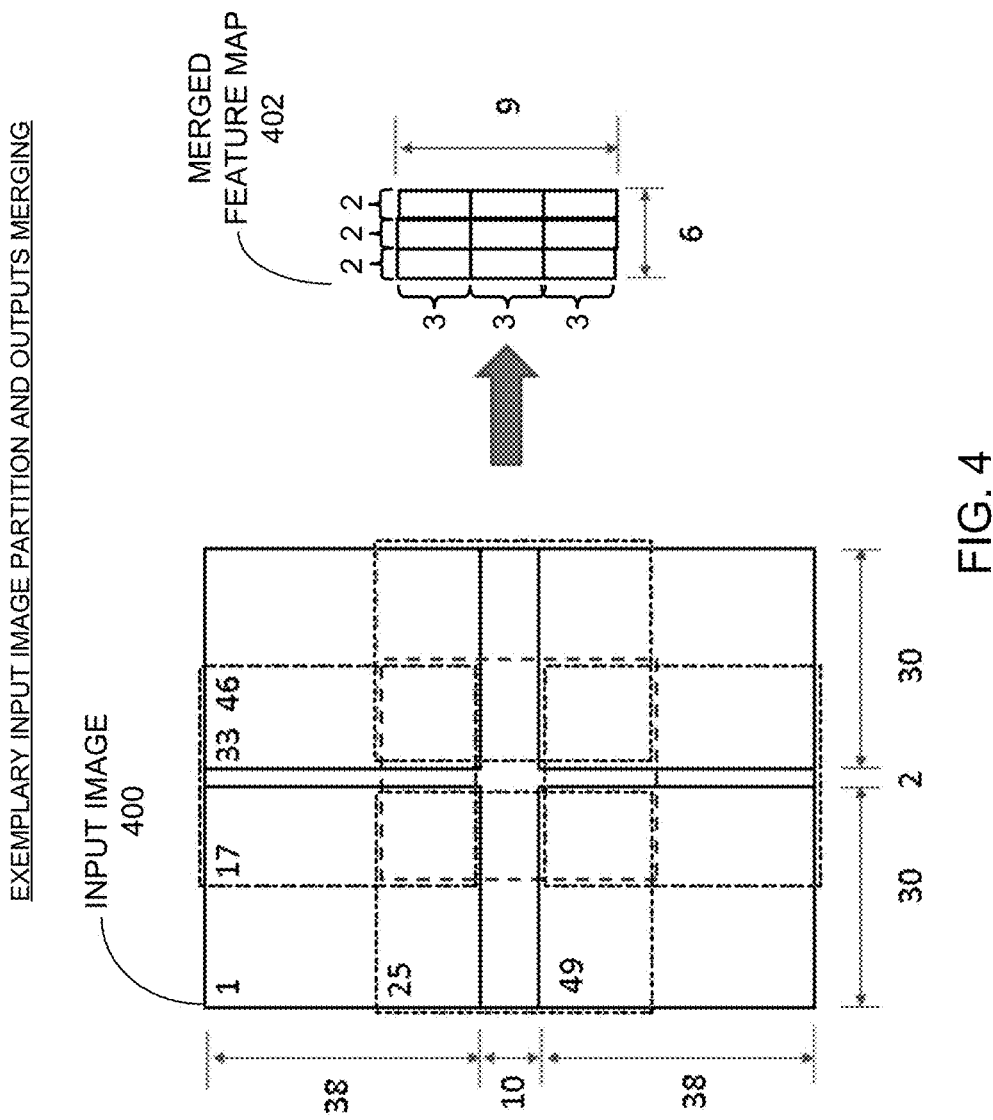
FIG. 4 shows an exemplary input image partition scheme for an 86×62 input image which includes both non-overlapping subimages and boundary subimages in accordance with some embodiments described herein.

FIG. 4 shows an exemplary input image partition scheme for an 86×62 input image 400 which includes both non-overlapping subimages and boundary subimages in accordance with some embodiments described herein. As can be seen in FIG. 4, input image 400 is partitioned into a set of nine 38×30 subimages, including four non-overlapping subimages and five boundary subimages similar to the subimage configuration shown in FIG. 3. Note that the four non-overlapping subimages are shown in solid lines while the five boundary subimages are shown in dashed lines. Also note that small artificial offsets are used to slightly separate the five boundary subimages so that they can be more easily distinguished from one another and also from the four non-overlapping subimages. However, these artificial offsets are only used for the purpose of visualizing these overlapping subimages and should not be construed as actual offsets between these subimages. In fact, the row coordinates of these nine subimages start at 1, 25, and 49, respectively, and the column coordinates of the nine subimages start at 1, 17, and 33, respectively. For example, the four corner pixels of boundary subimage in the middle has (row, column) coordinates of (25, 17), (25, 46), (62, 17), (62, 46), respectively.

For the 86×62 input image 400, the disclosed CNN system 210 can reuse a single CNN1 module 214 nine times, each time to process an input subimage size of 38×30. As can be seen in FIG. 4, the outputs of CNN1 module 214 is a 2D array (i.e., 3×3) of 3×2-pixel feature maps with properly designed shifted such that they can be merged into a 9×6-pixel merged feature map 402 corresponding to the full input image 400 (i.e., there is no gap or overlap between any given pair of adjacent 3×2-pixel feature maps in the merged feature map 402). In the example Hi3519 chipset, each subimage processing takes about 1 ms and the maximum number of output feature maps is 50 (corresponding to 50 filters). Therefore, for Hi3519 chipset the output size of each subimage is 3×2×50, and the total output size is 9×6×50. Software implementation of the FC layers and ReLU layers takes less than 3 ms. Consequently, the total running time for a face-recognition application on an 86×62 input image takes only about 12 ms when using the built-in hardware CNN module within Hi3519 chipset.

As discussed above, the proposed subimage-based CNN system 210, which is configured to apply one or more small-scale CNN1 modules to a set of overlapped subimages and merges the outputs, can generate exactly or substantially the same result as the conventional full-image-based CNN system 200 which applies the same set of filters to the entire input image. Consequently, in some embodiments, the proposed subimage-based CNN system can be designed by training the conventional full-image-based CNN system 200 and copy the set of trained filters, i.e., network weights of CNN system 200, to a corresponding set of filters in the proposed CNN1 and CNN2 modules. During the training of the conventional full-image-based CNN system 200, one may only need to ensure the full image size satisfies Eqn. (3), without simulating the subimage-based implementation. In these embodiments, the complexity of designing the proposed subimage-based CNN is not increased.

In this patent disclosure, a subimage-based CNN architecture and system based on reusing small-scale hardware CNN modules is described. The disclosed CNN architecture and system is suitable for resource-limited systems, such as some embedded systems and mobile devices. In some embodiments, an original input image is partitioned into a set of subimages of the same size, which includes properly designed gaps and/or overlaps among the set of subimages. These subimages can be fed into a resolution-limited small-scale hardware CNN module sequentially for the convolution-ReLU-pooling operations. The outputs from the set of subimages can then be merged to form merged feature maps, and the merged feature maps can be exactly or substantially identical to the generated feature maps from applying a full-imaged-based large-scale CNN system to the entire input image without partitioning the input image. The merged feature maps can then be processed by the next stage of the disclosed CNN architecture and system, which can be implemented either in hardware by a small-scale hardware CNN module or entirely in software. The disclosed CNN architecture and system can therefore perform high-complexity CNN tasks on resource-limited embedded systems based on using resolution-limited small-scale CNN modules.

Figure 5:
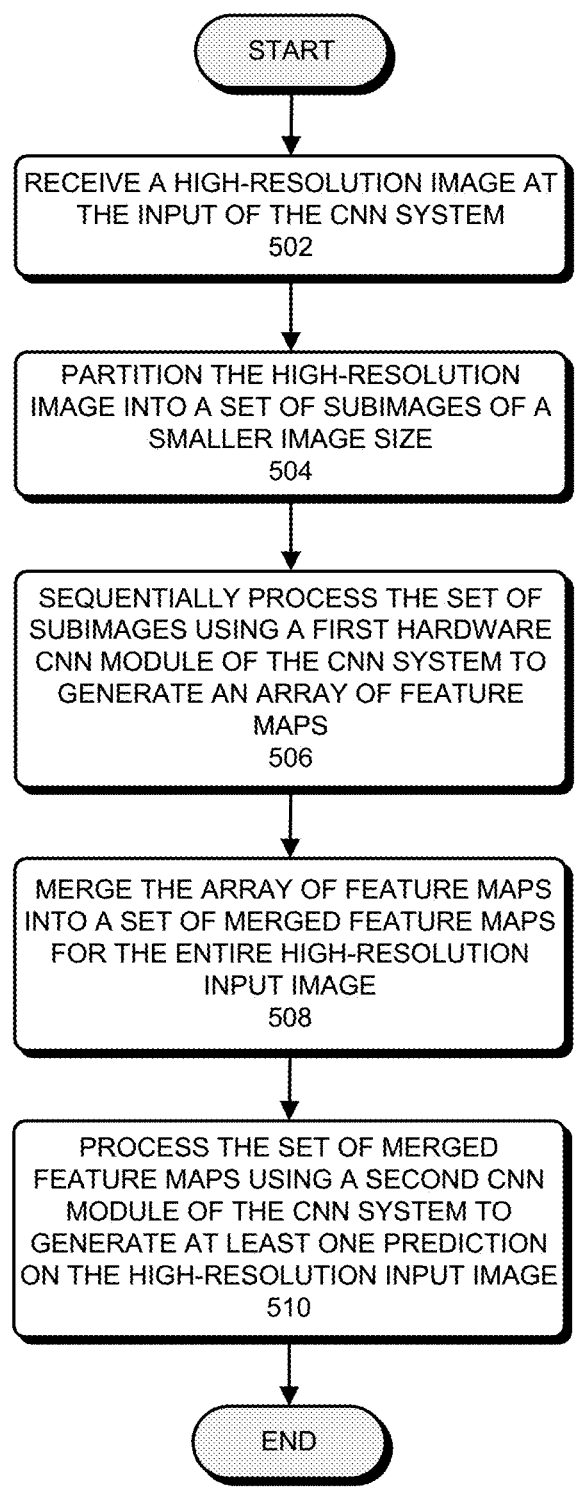
FIG. 5 presents a flowchart illustrating a process for performing image processing using the disclosed subimage-based CNN system in accordance with some embodiments described herein.

FIG. 5 presents a flowchart illustrating a process for performing image processing using the disclosed subimage-based CNN system in accordance with some embodiments described herein. The process may begin when a high-resolution image is received at the input of a disclosed subimage-based CNN system, such as CNN system 210 (step 502). In some embodiments, the high-resolution input image is captured by a high-resolution camera, such as a surveillance camera, a machine vision camera, cameras on a self-drive car, or mobile phone cameras. Next, the high-resolution input image is partitioned into a set of subimages of a smaller image size at an input module of the CNN system (step 504). In some embodiments, the set of subimages from step 504 includes both a two-dimensional array of non-overlapping subimages and a set of boundary subimages positioned across the boundaries of the set of non-overlapping subimages.

Next, the set of subimages are sequentially processed by a first hardware CNN module within the first processing stage of the CNN system to generate an array of feature maps (step 506). In some embodiments, the first hardware CNN module is a small-scale low-cost hardware CNN module configured to process low-resolution input images and have a maximum input image size. As such, the image size of the high-resolution input image is significantly greater than the maximum input image size of the first hardware CNN module. In some embodiments, the first hardware CNN module can include a set of convolution (CONV) layers, a set of ReLU layers, and a set of pooling layers coupled in series, and processing each of the received subimages using the first hardware CNN module includes alternatively applying a CONV layer in the set of CONV layers and a pooling layer in the set of pooling layers on the received subimage. Note that as an alternative to step 506, the set of subimages can be processed by two or more identical hardware CNN modules within the first processing stage of the CNN system to generate the same array of feature maps. More specifically, the set of subimages can be divided up into two or more subsets of subimages, and each subset of the two or more subsets of subimages can be sequentially processed by one of the two or more hardware CNN modules while the two or more subsets of subimages can be processed by the two or more hardware CNN modules in parallel.

Referring back to FIG. 5, next, the array of feature maps output by the first hardware CNN module is merged into a set of merged feature maps by a merging module of the CNN system (step 508). More specifically, the merged feature maps represent the full feature maps for the entire high-resolution input image. In some embodiments, the set of merged feature maps is substantially identical to a set of feature maps generated by convolution-ReLU-pooling layers of a large-scale CNN system which processes the high-resolution input image as a whole without partitioning the high-resolution input image. Next, the set of merged feature maps are processed by a second CNN module within the second processing stage of the CNN system to generate at least one prediction on the high-resolution input image (step 510). In some embodiments, processing the set of merged feature maps includes alternatively applying an FC layer in a set of FC layers and an ReLU layer in a set of ReLU layers on the set of merged feature maps.

Figure 6:
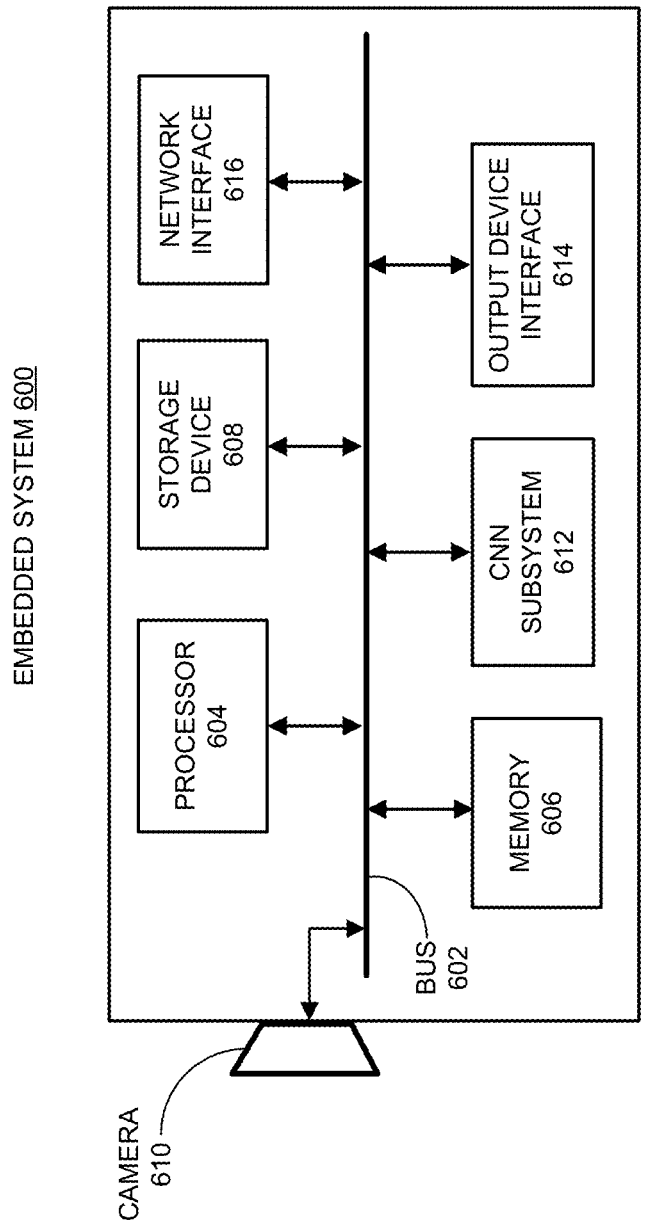
FIG. 6 illustrates an exemplary embedded system within which the disclosed subimage-based CNN system is used to perform deep learning (DL) image processing on captured images in accordance with some embodiments described herein.

FIG. 6 illustrates an exemplary embedded system 600 within which the disclosed subimage-based CNN system is used to perform deep learning (DL) image processing on captured images in accordance with some embodiments described herein. Embedded system 600 can be integrated with or implemented as a surveillance camera, a machine vision camera, a drone, a robot, or a self-driving car. As can be seen in FIG. 6, embedded system 600 can include a bus 602, a processor 604, a memory 606, a storage device 608, a camera 610, a CNN subsystem 612, an output device interface 614, and a network interface 616.

Bus 602 collectively represents all system, peripheral, and chipset buses that communicatively couple the various components of embedded system 600. For instance, bus 602 communicatively couples processor 604 with memory 606, storage device 608, camera 610, CNN subsystem 612, output device interface 614, and network interface 616.

From memory 606, processor 604 retrieves instructions to execute and data to process in order to control various components of embedded system 600. Processor 604 can include any type of processor, including, but not limited to, a microprocessor, a mainframe computer, a digital signal processor, a personal organizer, a device controller and a computational engine within an appliance, and any other processor now known or later developed. Furthermore, processor 604 can include one or more cores. Processor 604 itself can include a cache that stores code and data for execution by processor 604.

Memory 606 can include any type of memory that can store code and data for execution by processor 604. This includes but not limited to, dynamic random access memory (DRAM), static random access memory (SRAM), flash memory, read only memory (ROM), and any other type of memory now known or later developed.

Storage device 608 can include any type of non-volatile storage device that can be integrated with embedded system 600. This includes, but is not limited to, magnetic, optical, and magneto-optical storage devices, as well as storage devices based on flash memory and/or battery-backed up memory.

Bus 602 is also coupled to camera 610. Camera 610 is configured to capture still images and/or video images at predetermined resolutions and couple the captured image data to various components within embedded system 600 via bus 602, such as to memory 606 for buffering and to CNN subsystem 612 for DL image processing. Camera 610 can be a digital camera. In some embodiments, camera 610 is a digital camera equipped with a wide-angle lens. The captured images by camera 610 can have different resolutions including high-resolutions such as at 1280×720p, 1920× 1080p or other high resolutions.

CNN subsystem 612 is configured to receive the captured images, such as captured high-resolution images via bus 602, perform aforementioned DL image processing on the received images and generate results for the captured images. CNN subsystem 612 can be implemented by one of the various embodiments of the disclosed subimage-based CNN system of this disclosure.

Output device interface 614 which is also coupled to bus 602, enables for example, the display of the results generated by CNN subsystem 612. Output devices used with output device interface 614 include, for example, printers and display devices, such as cathode ray tube displays (CRT), light-emitting diode displays (LED), liquid crystal displays (LCD), organic light-emitting diode displays (OLED), plasma displays, or electronic paper.

Finally, as shown in FIG. 6, bus 602 also couples embedded system 600 to a network (not shown) through a network interface 616. In this manner, embedded system 600 can be a part of a network (such as a local area network ("LAN"), a wide area network ("WAN"), or an Intranet, or a network of networks, such as the Internet. Any or all components of embedded system 600 can be used in conjunction with the subject disclosure.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

While this patent document contains many specifics, these should not be construed as limitations on the scope of any disclosed technology or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A convolutional neural network (CNN) system for processing digital images, comprising:
    a receiving module for receiving a digital image of a first image size, wherein the receiving module is configured to partition the digital image into a set of subimages of a second image size, wherein the second image size is smaller than the first image size;
    a first processing stage comprising a first hardware CNN module configured with a maximum input image size, wherein the first hardware CNN module is further configured to sequentially:
        receive each subimage in the set of subimages; and
        process each received subimage to generate a set of outputs;
    a merging module configured to sequentially receive the sets of outputs from the first processing stage and merge the sets of outputs into a set of merged feature maps; and
    a second processing stage configured to receive the set of merged feature maps and process the set of merged feature maps to generate an output of the CNN system, wherein the output includes at least one prediction on the digital image.

2. The CNN system of claim 1,
    wherein the first image size is greater than the maximum input image size of the first hardware CNN module; and
    wherein the second image size is smaller than or equal to the maximum input image size of the first hardware CNN module.

3. The CNN system of claim 1, wherein the set of subimages includes a first subset of subimages and a second subset of subimages, wherein the receiving module is configured to partition the digital image by:
    partitioning the digital image into the first subset of subimages of rows and columns separated by gaps, wherein a pair of adjacent subimages in a row of the first subset of subimages is separated by a first gap, and wherein a pair of adjacent subimages in a columns of the first subset of subimages is separated by a second gap; and
    generating the second subset of subimages such that each of the second subset of subimages is positioned to partially overlap with at least a pair of adjacent subimages in the first subset of subimages and over either the first gap or the second gap between the pair of adjacent subimages.

4. The CNN system of claim 1, wherein the first hardware CNN module includes a set of convolution (CONV) layers, a set of ReLU layers, and a set of pooling layers coupled in series, and wherein processing each of the received subimages using the first hardware CNN module includes alternatively applying a CONV layer in the set of CONV layers, an ReLU layer in the set of ReLU layers, and a pooling layer in the set of pooling layers on the received subimage.

5. The CNN system of claim 1, wherein the first hardware CNN module further includes a set of filters, and wherein the set of outputs associated with each of the processed subimages corresponds to the set of filters.

6. The CNN system of claim 1, wherein the set of merged feature maps is substantially identical to a set of feature maps generated by convolution-ReLU-pooling layers of a large-scale CNN system which processes the digital image as a whole without partitioning the digital image.

7. The CNN system of claim 1, wherein the second processing stage includes a set of fully-connected (FC) layers and a set of ReLU layers coupled in series, and wherein processing the set of merged feature maps includes alternatively applying an FC layer in the set of FC layers and an ReLU layer in the set of ReLU layers on the set of merged feature maps.

8. The CNN system of claim 1, wherein the second processing stage is implemented in software.

9. The CNN system of claim 1, wherein the second processing stage is implemented in hardware with a second hardware CNN module.

10. The CNN system of claim 9, wherein both the first hardware CNN module and the second hardware CNN module are implemented based on a small-scale hardware CNN module that includes a set of convolution layers, a first set of ReLU layers, a set of pooling layers, a set of fully-connected (FC) layers, and a second set of ReLU layers:
    wherein the first hardware CNN module is implemented by bypassing the set of FC layers and the second set of ReLU layers in the small-scale hardware CNN module; and
    wherein the second hardware CNN module is implemented by bypassing the set of convolution layers, the first set of ReLU layers, and the set of pooling layers in the small-scale hardware CNN module.

11. The CNN system of claim 1, wherein the first hardware CNN module is a small-scale low-cost hardware CNN module configured to process low-resolution input images for such applications as handwritten digit recognition and license plate recognition.

12. A method for performing image processing using a convolutional neural network (CNN), the method comprising:
receiving an digital image of a first image size;
partitioning the digital image into a set of subimages of a second image size, wherein the second image size is smaller than the first image size;
processing the set of subimages using a first hardware CNN module configured with a maximum input image size, wherein the processing includes:
sequentially receiving each subimage in the set of subimages; and
sequentially processing each received subimage to generate a set of outputs;
merging the sets of outputs into a set of merged feature maps; and
processing the set of merged feature maps to generate at least one prediction on the digital image.

13. The method of claim 12,
wherein the first image size is greater than the maximum input image size of the first hardware CNN module; and
wherein the second image size is smaller than or equal to the maximum input image size of the first hardware CNN module.

14. The method of claim 12, wherein the set of subimages includes a first subset of subimages and a second subset of subimages, wherein partitioning the digital image includes:
partitioning the digital image into the first subset of subimages of rows and columns separated by gaps, wherein a pair of adjacent subimages in a row of the first subset of subimages is separated by a first gap, and wherein a pair of adjacent subimages in a columns of the first subset of subimages is separated by a second gap; and
generating the second subset of subimages such that each of the second subset of subimages is positioned to partially overlap with at least a pair of adjacent subimages in the first subset of subimages and over either the first gap or the second gap between the pair of adjacent subimages.

15. The method of claim 12, wherein sequentially processing each of the received subimages includes alternatively applying a convolution layer in a set of convolution layers, an ReLU layer in a set of ReLU layers, and a pooling layer in a set of pooling layers on the received subimage.

16. The method of claim 12, wherein sequentially processing each of the received subimages further includes applying a set of filters on the received subimage, and wherein the set of outputs associated with each of the processed subimages corresponds to the set of filters.

17. The method of claim 12, wherein the set of merged feature maps is substantially identical to a set of feature maps generated by convolution-ReLU-pooling layers of a large-scale CNN system which processes the digital image as a whole without partitioning the digital image.

18. The method of claim 12, wherein processing the set of merged feature maps includes alternatively applying an FC layer in a set of FC layers and an ReLU layer in a set of ReLU layers on the set of merged feature maps.

19. The method of claim 12, wherein processing the set of merged feature maps includes using a second hardware CNN module.

20. The method of claim 19, wherein both the first hardware CNN module and the second hardware CNN module are implemented based on a small-scale hardware CNN module that includes a set of convolution layers, a first set of ReLU, a set of pooling layers, a set of FC layers, and a second set of ReLU layers:
wherein the first hardware CNN module is implemented by bypassing the set of FC layers and the second set of ReLU layers in the small-scale hardware CNN module; and
wherein the second hardware CNN module is implemented by bypassing the set of convolution layers, the first set of ReLU layers, and the set of pooling layers in the small-scale hardware CNN module.

21. A convolutional neutral network (CNN) system, comprising:
a receiving module for receiving a digital image of a first image size, wherein the receiving module is configured to partition the input image into a set of subimages of a second image size, wherein the second image size is smaller than the first image size;
a first processing stage comprising a first hardware CNN module and a second hardware CNN module, wherein each of the first and second hardware CNN modules is configured with a maximum input image size, and wherein:
the first hardware CNN module is further configured to sequentially:
receive each subimage in a first subset of the set of subimages; and
process each received subimage in the first subset to generate a first set of outputs; and
the second hardware CNN module is further configured to sequentially:
receive each subimage in a second subset of the set of subimages; and
process each received subimage in the second subset to generate a second set of outputs;
wherein the first hardware CNN module and the second hardware CNN module are configured to process the first subset of subimages and the second subset of subimages in parallel;
a merging module configured to receive the first sets of outputs and the second sets of outputs from the first processing stage and merge the first and second sets of outputs into a set of merged feature maps; and
a second processing stage configured to receive the set of merged feature maps and process the set of merged feature maps to generate an output of the CNN system, wherein the output includes at least one prediction on the digital image.

22. A system capable of performing deep learning on digital images, the system comprising:
a processor;
a memory coupled to the processor;
an image capturing device coupled to the processor and the memory and configured to capture digital images of a first image size;
a convolutional neutral network (CNN) subsystem coupled to the processor and the memory, wherein the CNN subsystem further includes:
a receiving module configured to receive an input image of the first image size captured by the image capturing device, wherein the receiving module is further configured to partition the input image into a set of subimages of a second image size;

a first processing stage comprising a first hardware CNN module configured with a maximum input image size, wherein the first hardware CNN module is further configured to sequentially:

receive each subimage in the set of subimages; and process each received subimage to generate a set of outputs;

a merging module configured to sequentially receive the sets of outputs from the first processing stage and merge the sets of outputs into a set of merged feature maps; and a second processing stage configured to receive the set of merged feature maps and process the set of merged feature maps to generate an output of the CNN subsystem, wherein the output includes at least one prediction on the input image.

23. The system of claim 22, wherein the first image size is greater than the maximum input image size of the hardware CNN module; and wherein the second image size is smaller than or equal to the maximum input image size of the hardware CNN module.

24. The system of claim 22, wherein the system includes a mobile device or an embedded system.

* * * * *